United States Patent
Greiwe et al.

(10) Patent No.: US 7,353,850 B2
(45) Date of Patent: Apr. 8, 2008

(54) DISPENSING DEVICE FOR DRINKS

(75) Inventors: Hansdieter Greiwe, Boxberg (DE); Rainer Herrmann, Lauda-Königshofen (DE)

(73) Assignee: Niro-Plan AG, Aarburg (CH)

( * ) Notice: Subject to any disclaimer, the term of this patent is extended or adjusted under 35 U.S.C. 154(b) by 10 days.

(21) Appl. No.: 10/525,808

(22) PCT Filed: Aug. 28, 2003

(86) PCT No.: PCT/EP03/09557

§ 371 (c)(1),
(2), (4) Date: Oct. 25, 2005

(87) PCT Pub. No.: WO2004/023949

PCT Pub. Date: Mar. 25, 2004

(65) Prior Publication Data

US 2006/0108023 A1 May 25, 2006

(30) Foreign Application Priority Data

Aug. 28, 2002 (DE) ................. 102 39 595

(51) Int. Cl.
*B67C 3/26* (2006.01)
(52) U.S. Cl. .............. 141/279; 141/198; 141/266; 141/270; 141/284
(58) Field of Classification Search ............. 141/83, 141/94, 198, 250, 266, 270, 279, 284
See application file for complete search history.

(56) References Cited

U.S. PATENT DOCUMENTS

| | | | | |
|---|---|---|---|---|
| 2,326,415 A | * | 8/1943 | Titus | 141/41 |
| 3,176,729 A | * | 4/1965 | Steiner | 141/275 |
| 3,509,954 A | * | 5/1970 | Sramcik | 177/122 |
| 4,437,497 A | * | 3/1984 | Enander | 141/1 |
| 4,588,001 A | * | 5/1986 | Leonard | 141/5 |
| 5,333,660 A | * | 8/1994 | Kohlmann et al. | 141/263 |
| 5,491,333 A | * | 2/1996 | Skell et al. | 250/222.1 |
| 6,082,246 A | | 7/2000 | Thorn et al. | |
| 6,100,518 A | * | 8/2000 | Miller | 250/222.1 |

FOREIGN PATENT DOCUMENTS

| | | |
|---|---|---|
| DE | 2 048 163 | 4/1972 |
| DE | 86 15 604 U1 | 3/1987 |
| DE | 200 17 859 U1 | 2/2002 |

\* cited by examiner

*Primary Examiner*—Timothy L. Maust
(74) *Attorney, Agent, or Firm*—Merchant & Gould P.C.

(57) ABSTRACT

A dispensing device dispenses drinks or similar dosable liquid foodstuffs, especially coffee, milk, soft drinks or soups. The dispensing device includes an identification device for identifying a vertical height of a container for receiving the foodstuff and for emitting a height signal, a filling device which can be arranged in such a way that the height thereof can be adjusted in relation to the container, and a control device which sets the filling device to a pre-controllable filling level in relation to the container, on the basis of the height signal, before the foodstuff is introduced into the container. In this way, a container can be filled in an optimum manner without spilling.

10 Claims, 1 Drawing Sheet

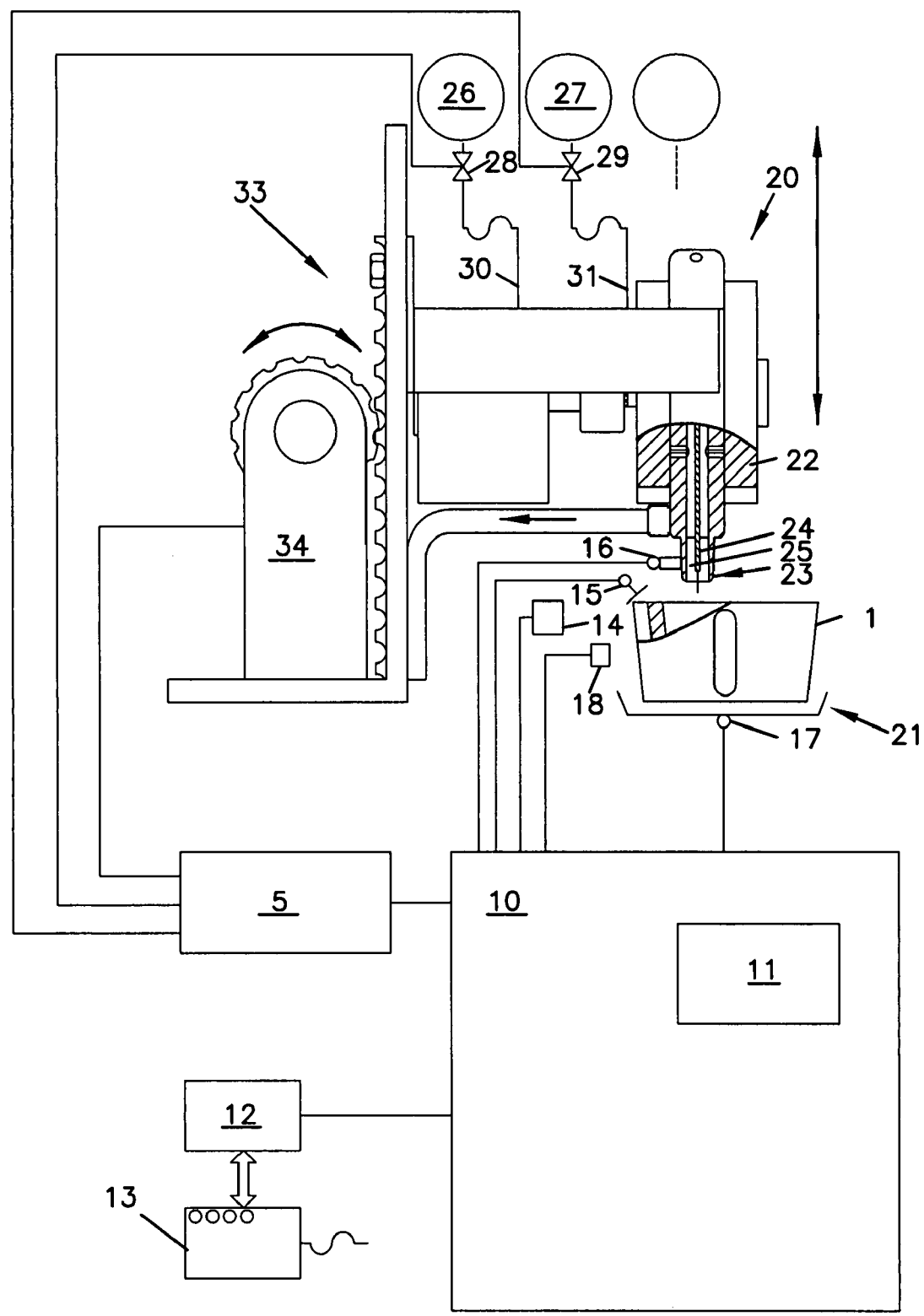

DISPENSING DEVICE FOR DRINKS

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

The invention relates to a dispensing device for drinks or similar dosable liquid foodstuffs, in particular for coffee, milk, soft drinks or soups.

BACKGROUND OF THE INVENTION

Such dispensing devices, usually called "drinks vending machines", have become customary not only in self-service restaurants or canteens, but are also used quite generally in gastronomy in order to reduce the number of service personnel. In order to dispense a large number of different drinks—espresso, cappuccino, latte macchiato and ordinary filter coffee are only some examples—a single dispensing device is used, with a filling mechanism capable of filling a container with drinks from various sources. Especially for supplying, e.g., cappuccino at an espresso machine, some work must be done by hand in order to achieve optimal formation and especially retention of foam. In the case of latte macchiato it is even necessary to provide a layering of the various "ingredients" so that coffee is at the bottom of the container, milk above that, and foam is on top of the milk. This is practically impossible with the conventional dispensing devices.

The object of the invention is to provide a dispensing device that enables optimal filling of a container.

BRIEF SUMMARY OF THE INVENTION

This object is achieved by a dispensing device for drinks or similar dosable liquid foodstuffs, in particular for coffee, milk, soft drinks or soups, in accordance with the present invention and comprising an identification means adapted to detect a vertical height of a container for receiving the foodstuff and to send out a height signal; a filling mechanism for filling the container with the foodstuff and mounted such that its height is adjustable relative to said container; and a control means that is adapted to operate in response to the height signal to adjust the relative height of the filling mechanism to a predefined filling height with respect to said container before said container is filled with the foodstuff by the filling mechanism.

The aim of the invention is that by means of a single filling mechanism, without additional work by hand, the various drinks can be put into the containers appropriate for each of them in such a way that a "falling height" can be set to be optimal for the drink in question. The result is not only to prevent soiling of the dispensing device by spray from the drink during filling; in addition, it can be ensured that because of the "gentle" filling a desired layering (foam on the cappuccino, the layers previously described in the case of latte macchiato) is achieved.

Preferably the control means is so constructed that after a filling process has been concluded, the filling mechanism is adjusted to a waiting position in which its height above the container is maximal. This height adjustment to a resting position after the filling process "signals" to the user that the filling process has now been completed. The next container can now be placed under the filling mechanism, regardless of the container's height.

Preferably the control means is so designed that various filling heights can be stored in memory. On one hand this enables the filling mechanism to be brought into an optimal position with respect to the container, while on the other hand a given container can thus be filled with various amounts of liquid, for which purpose various filling heights can be prespecified. In this case preferably the various filling heights are stored in association with various foodstuffs, so that in a glass a larger filling height is permitted for latte macchiato, with foam on top, than for a coffee with milk (but no foam).

The identification means preferably comprises a filling-state sensor, by way of which to set a maximal filling state for the container, i.e. the amount of the foodstuff with which the container can be filled. In this way it can be ensured that an intentionally wrong operation to obtain multiple filling does not cause the container to overflow.

The identification means preferably comprises a programmable memory in which the height signals corresponding to various identification signals can be stored. In this way items of information about the container that do not primarily have anything to do with its height can be used to find the optimal height adjustment. For example, the container can be weighed and stored values can then be used to determine from this weight the height adjustment that should be made. It is also possible to provide the container with identifying labels such as magnetic strips, so that from this information the height of the container can be directly or indirectly derived.

In one embodiment of the invention the identification means comprises sensors for (directly) detecting the height of the container, and in particular these sensors can be constructed as a light barrier. Thus in this case a direct height measurement is made.

Alternatively or in addition the identification means comprises reading means to read information attached to the container, for example the above-mentioned magnetic strips or a barcode. Such arrangements can be very easily produced.

Preferably a learning means is provided that comprises a manually operated adjustment device to adjust the filling mechanism and to store a height signal in association with a specific container. The manufacturer (or the manager of the site) can thus, in a learning process, conduct trials to find an optimal filling height for the containers he has available and store the results in such a way that the filling mechanism, when a customer places a container of the same kind under it, is automatically adjusted to the prespecified (learned) height.

Preferably the filling mechanism comprises a container receptacle that is fixed in position and an adjustable dispensing region, so that the container can always be set down at the same height. The dispensing region is preferably connected to foodstuff-supply apparatus, such as storage vessels or the coffee-filter outflow etc., in such a way that a distance over which the foodstuff passes on the way from the supply means to an outlet into the open air is independent of the height of the filling mechanism. As a result, a uniform quality of the product can be ensured even for different filling heights.

BRIEF DESCRIPTION OF THE DRAWING

An exemplary embodiment of the present invention will now be described with reference to the accompanying drawing in which a dispensing device in accordance with the invention is shown schematically along with associated sensors and an identification means in a block diagram format.

DETAILED DESCRIPTION OF THE INVENTION

As shown in the drawing, a container 1, in the present case a cup, is set onto a container receptacle 21 of a filling mechanism 20. Above the cup 1 is an outlet 23, which comprises a first pipeline 24 and a second pipeline 25 that are united shortly ahead of the opening of the outlet 23. The outlet 23 is situated within a dispensing region 22 of the filling mechanism 20, which by way of a rack-and-pinion drive mechanism 33 with an adjustment gear 34 can be moved upward and downward (see double-headed arrow), so as to be lowered toward the container 1 or raised away from it. The first pipeline 24 and second pipeline 25, and hence the outlet 23, are connected by way of valves 28, 29 (and where appropriate, additional valves) as well as a first conduit 30 and a second conduit 31 (and where appropriate, additional conduits) to a first supply means 26 and a second supply means 27 (and where appropriate, additional supply means, as indicated in the drawing). The valves 28, 29 are controlled by a control means 9, which receives its command signals from an identification means 10. To the identification means 10 are sent the output signals of the following sensors: a height sensor 14 for measuring the height of the upper rim of the container above the surface of the receptacle 21; a first, immovably mounted filling-state sensor 15; a second filling-state sensor 16, which is fixed to the dispensing region 22; a weighing means 17 to measure the weight of the container 1; and a reading means 18 to read whatever information has been applied to the container 1. From the data the identification means 10 receives from the sensors 14 to 18, the height of the container and the level of the liquid in the container can be derived. Other data that can be used for this purpose are stored in a memory 11 of the identification means 10, in particular data concerning the physical dimensions (in particular the height and the nature of the container). From these data the identification means derives signals by means of which the control means 9 operates the adjustment drive 34 in such a way that the dispensing region 22 of the filling mechanism 20 is shifted toward the container 1 far enough that the opening of the outlet 23 is at a relatively slight vertical distance from the upper rim of the container, or in some cases is even within the container 1, before the valves 28 and 29 are opened to dispense the foodstuff. This enables the container 1 to be filled in an optimal way, with no spray or splashes. In principle, of course, it is also possible to move the container receptacle 21 up and down rather than the dispensing region 22, in order to adjust their relative heights.

The control means 9 is so designed that after completion of a filling process, i.e. when a prespecified amount of liquid has been dispensed, the dispensing region 22 is moved upward by the adjustment drive 34 to its highest position, so that the customer can easily discern that the dispensing is finished and another container, e.g. with a considerably greater height, can be placed on the container receptacle 21 to be filled.

It is now possible to undertake the described control procedures and lowering of the dispensing region 22 toward the container 1 on the basis of continuous measurements, in particular by the height sensor 14. In this process a retraction (raising) of the dispensing region 22 relative to the liquid level can also be done simultaneously, on the basis of the second filling-state sensor 16. However, for this control procedure a greater degree of reliability can be achieved by "identifying" the container 1 so that its height, which has previously been measured precisely, is read out from the memory 11 and the height adjustment of the dispensing region 22 is selected accordingly. This prior measurement can be accomplished particularly simply by a learning means 12 with a keyboard 13, which is designed so that in a first setting procedure a particular kind of container 1, e.g. an espresso cup, is set onto the receptacle 21 and the dispensing region 22 is lowered to the desired height under manual control, by way of the keyboard 13. Then the output signals from the various sensors are used to identify the container, by way of the learning means 12, and are stored in the memory 11 along with the manually adjusted height. When another container 1 of the same kind is put onto the receptacle 21 by a customer, the identification means 10 can identify the container by comparison with the stored data and move the dispensing region 22 to the required position by way of the control means 9.

From the above it can be seen that the invention relates not only to a dispensing device, but also to a method for operating a dispensing device.

LIST OF REFERENCE NUMERALS

1 Container
9 Control means
10 Identification means
11 Memory
12 Learning means
13 Keyboard
14 Height sensor
15 1st filling-state sensor
16 2nd filling-state sensor
17 Weighing means
18 Reading means
20 Filling mechanism
21 Container receptacle
22 Dispensing region
23 Outlet
24 1st pipeline
25 2nd pipeline
26 1st supply means
17 2nd supply means
28 1st valve
29 2nd valve
30 1st conduit
31 2nd conduit
33 Rack-and-pinion gear
34 Adjustment drive

The invention claimed is:
1. Dispensing device for drinks or similar dosable liquid foodstuffs, comprising:
 identification means adapted to detect a vertical height of a container for receiving the foodstuff and to send out a height signal;

a filling mechanism for filling the container with the foodstuff and mounted such that its height is adjustable relative to said container; and control means adapted to operate in response to the height signal to adjust the relative height of the filling mechanism to a predefined filling height with respect to said container, before said container is filled with the foodstuff by the filling mechanism; wherein the control means includes a memory and is adapted to store a plurality of filling heights in said memory; wherein said plurality of filling heights are stored in association with data associated with a plurality of foodstuffs.

2. Dispensing device according to claim 1, wherein the control means is adapted to adjust the height of the filling mechanism into a waiting position in which its height above the container is maximal after a filling procedure has been completed.

3. Dispensing device according to claim 1, wherein the identification means includes at least one filling-state sensor that sets a maximal filling state for said container when said container is being filled with the foodstuff.

4. Dispensing device according to claim 1, wherein the identification means includes a programmable memory in which height signals corresponding to various identification signals are stored.

5. Dispensing device according to claim 1, wherein the identification means comprises sensors to detect the height of said container.

6. Dispensing device according to claim 5, wherein the sensors comprise light barriers.

7. Dispensing device according to claim 1, wherein the identification means includes reading means to read information provided on said container.

8. Dispensing device according to claim 1, wherein the filling mechanism comprises a plurality of filling lines leading to a plurality of liquid foodstuffs.

9. Dispensing device for drinks or similar dosable liquid foodstuffs, comprising:

identification means adapted to detect a vertical height of a container for receiving the foodstuff and to send out a height signal;

a filling mechanism for filling the container with the foodstuff and mounted such that its height is adjustable relative to said container;

control means adapted to operate in response to the height signal to adjust the relative height of the filling mechanism to a predefined filling height with respect to said container, before said container is filled with the foodstuff by the filling mechanism; and learning means with manually actuatable adjustment means to adjust the position of the filling mechanism and to store a height signal associated with a particular container.

10. Dispensing device for drinks or similar dosable liquid foodstuffs, comprising:

identification means adapted to detect a vertical height of a container for receiving the foodstuff and to send out a height signal;

a filling mechanism for filling the container with the foodstuff and mounted such that its height is adjustable relative to said container;

control means adapted to operate in response to the height signal to adjust the relative height of the filling mechanism to a predefined filling height with respect to said container, before said container is filled with the foodstuff by the filling mechanism; and foodstuff-supply means defining an outlet and wherein the filling mechanism comprises a container receptacle tat is fixed in position and a movable dispensing region that is connected to said foodstuff-supply means such that a distance over which a foodstuff must pass on the way from the supply means to said outlet into the open air is independent of the height of the filling mechanism above the container receptacle.

* * * * *